(12) United States Patent
Eglin

(10) Patent No.: US 7,451,949 B2
(45) Date of Patent: *Nov. 18, 2008

(54) METHOD FOR USING A TILTABLE STABILIZER TO REDUCE VIBRATION GENERATED ON THE FUSELAGE OF A HELICOPTER

(75) Inventor: Paul Eglin, Aix En Provence (FR)

(73) Assignee: Eurocopter, Marignane (FR)

( * ) Notice: Subject to any disclaimer, the term of this patent is extended or adjusted under 35 U.S.C. 154(b) by 216 days.

This patent is subject to a terminal disclaimer.

(21) Appl. No.: 11/020,066

(22) Filed: Dec. 23, 2004

(65) Prior Publication Data

US 2006/0027701 A1    Feb. 9, 2006

(30) Foreign Application Priority Data

Dec. 23, 2003   (FR)  .................................. 03 15297

(51) Int. Cl.
*G05D 1/00* (2006.01)
*B64C 13/00* (2006.01)
*B64C 11/00* (2006.01)
*B64C 27/78* (2006.01)

(52) U.S. Cl. .................... 244/195; 244/174; 244/17.13; 244/17.19; 244/87; 244/91

(58) Field of Classification Search .............. 244/17.13, 244/17.19, 17.27, 76 R, 76 C, 194, 195; 701/3, 10

See application file for complete search history.

(56) References Cited

U.S. PATENT DOCUMENTS

| 2,832,551 | A | * | 4/1958 | Gille ........................... 244/191 |
| 2,985,409 | A | * | 5/1961 | Atwood et al. ............... 244/191 |
| 2,998,120 | A | * | 8/1961 | Carter, Jr. ................... 244/177 |
| 3,721,404 | A | * | 3/1973 | Albert ....................... 244/17.19 |
| 4,213,584 | A | * | 7/1980 | Tefft et al. ................ 244/17.13 |
| 4,462,559 | A | * | 7/1984 | Garza ........................ 244/17.19 |
| 4,598,887 | A | * | 7/1986 | Jordan ....................... 244/17.11 |
| 4,814,764 | A | * | 3/1989 | Middleton ................... 340/967 |
| 5,072,893 | A | * | 12/1991 | Chakravarty et al. ....... 244/76 R |
| 5,082,207 | A |  | 1/1992 | Tulinius |
| 5,108,044 | A | * | 4/1992 | Weiner et al. ............. 244/17.19 |
| 5,224,667 | A | * | 7/1993 | Lacabanne ................... 244/191 |

(Continued)

FOREIGN PATENT DOCUMENTS

FR            2 678 578         1/1993

(Continued)

*Primary Examiner*—Michael R Mansen
*Assistant Examiner*—Joshua J Michener
(74) *Attorney, Agent, or Firm*—Young & Thompson

(57) ABSTRACT

A method and a device allow for reducing the vibration generated on the structure 17 of a helicopter 2 by the air flow through the main rotor 5 and by the air flow along the fuselage 3. The device 1 includes: at least one sensor 18, 19, 20 measuring the vibration generated on the structure 17; and computer element 30 responsive to the measurements to determine a variation in angle of incidence for a stabilizer 39 of the helicopter 2 that is suitable for generating a vertical opposing force $\vec{TZ}$ for opposing the vertical vibration, with the variation in angle of incidence as determined in this way being transmitted to a system 10 for controlling the angle of incidence of the stabilizer 39.

7 Claims, 2 Drawing Sheets

U.S. PATENT DOCUMENTS

| | | | |
|---|---|---|---|
| 5,316,240 A * | 5/1994 | Girard et al. | 244/17.27 |
| 5,375,794 A * | 12/1994 | Bleeg | 244/76 C |
| 5,388,785 A * | 2/1995 | Rollet et al. | 244/17.19 |
| 5,669,582 A * | 9/1997 | Bryant et al. | 244/76 C |
| 5,816,533 A * | 10/1998 | Krysinsky | 244/17.13 |
| 5,895,012 A * | 4/1999 | Krysinski et al. | 244/17.13 |
| 6,416,017 B1 * | 7/2002 | Becker | 244/76 C |
| 6,915,989 B2 * | 7/2005 | Najmabadi et al. | 244/195 |
| 6,986,483 B2 * | 1/2006 | Kubica | 244/76 R |
| 7,017,857 B2 * | 3/2006 | Hill et al. | 244/17.13 |

FOREIGN PATENT DOCUMENTS

| | | |
|---|---|---|
| FR | 2 737 181 | 1/1997 |
| FR | 2 747 099 | 10/1997 |

* cited by examiner

METHOD FOR USING A TILTABLE STABILIZER TO REDUCE VIBRATION GENERATED ON THE FUSELAGE OF A HELICOPTER

The present invention relates to a method and to a device for reducing the vibration generated on the structure of a helicopter both by the flow of air coming from the main rotor which serves to provide lift and propulsion to the helicopter and by the flow of air along its fuselage.

BACKGROUND OF THE INVENTION

It is known that when the main rotor turns, it sucks in air from upstream and blows it out downstream like a propeller, thereby allowing the helicopter to fly up and down. When flying forwards, the rotor acts both as a propeller and as a wing. As a propeller it accelerates the mass of air that passes through it so as to create a moving slipstream, with the pressure and the speed of the air varying along said slipstream. Acting as a wing, the rotor causes the slipstream to be deflected.

The stream of air downstream from the main rotor, commonly referred to as the "slipstream", is disturbed in part by the main elements for rotating the main rotor and by certain fairings, or indeed the helicopter fuselage itself, in particular when carrying external loads or during special flight configuration.

The main rotor is set into rotation by a driving force applied to its shaft. For this purpose, the engine on board the helicopter drives the shaft via an appropriate mechanical assembly. This leads to equal and opposite torque being applied to the fuselage, and this torque needs to be compensated by means of an auxiliary device such as a tail rotor, which is generally also driven by the same engine.

In addition the fuselage and the rotors, it is also known that a helicopter also includes one or more substantially horizontal stabilizers and one more substantially vertical tail fins. These elements are for the most part located at the rear of the fuselage and serve to provide the helicopter with control, stability, and the ability to maneuver about two perpendicular axes. It should be observed that the horizontal stabilizers and the tail fin may sometimes be constituted in the form of a single assembly of T-shape or of cross-shape (+). Similarly, the vertical tail fin may be formed by a single aerodynamic surface or it may be in the form of two aerodynamic surfaces forming a V-shape, for example. Another solution consists in placing a substantially vertical tail fin at the outside end of a substantially horizontal stabilizer. Nevertheless, these examples are not limiting.

The tail fin and the stabilizer are generally stationary and are consequently located at the rear end of the fuselage (in a zone referred to as the "tail boom" by the person skilled in the art), and they are to be found in a zone which is subjected at least in part to the air flow or slipstream coming from the main rotor and from the fuselage.

In practice, the main rotor acts like an aerodynamic exciter. Thus, its slipstream is turbulent. Turbulence corresponds to variations in pressure, speed, and angle of incidence of the aerodynamic flow that are distributed over quite a broad range of relatively high frequencies.

The slipstream behind the main rotor of a helicopter is pulsed at a fundamental frequency equal to the product $b \times \Omega$ where $\underline{b}$ is the number of blades of the main rotor and $\Omega$ is the speed of rotation of said rotor.

Nevertheless, frequencies which are harmonics of $b \times \Omega$ can sometimes also appear.

Under such conditions, the tail fin and the stabilizer are subjected simultaneously to said aerodynamic excitation which leads directly to exciting resonant modes of the helicopter structure. This phenomenon is generally known as "tail shake".

Furthermore, during certain stages of flight (e.g. during quartering flight), it is possible that the "tail shake" phenomenon is caused not by the slipstream from the main rotor but by the slipstream from the fuselage. A helicopter fuselage often carries external items (winches, missiles, torpedoes, auxiliary tanks, . . . ) which have the effect of spoiling (increasing drag and turbulence) the air flow from the fuselage itself. The turbulence which is the main cause of said tail shake can be small or negligible during nominal flight (cruising flight in a calm atmosphere), but can become much stronger during certain stages of flight (quartering flight, flight in a turbulent atmosphere, . . . ).

Even if the aerodynamic excitation is relatively small, it can lead to a level of vibration that is disagreeable in the cockpit and in the passenger cabin and that is harmful for the structure as a whole and for the mechanical elements of the helicopter.

The vibration as generated in this way can be distributed over the various axes of the structure as a function of where the slipstream strikes. For example, if it is applied to the vertical tail fin, that will generate an effect that is mainly lateral, and in particular it will excite a first mode of resonance in lateral bending of the tail boom. Conversely, if the slipstream reaches the horizontal stabilizer, then the vibration will be mainly vertical, thereby exciting the first resonant mode of the tail boom in vertical bending.

The various kinds of vibration due to the first lateral and/or vertical bending mode of the structure of the helicopter, and possibly also to a resonant mode in twisting of the helicopter, all present numerous drawbacks, including the following:

a reduction in crew and passenger comfort;
material and equipment fatigue; and
problems associated with operating on-board equipment such as weapons systems when the helicopter is fitted therewith.

In an attempt to provide a solution to this problem, documents FR 2 737 181 and U.S. Pat. No. 5,816,533 disclose a method and a device for generating an effect that opposes specifically vertical vibration, by applying alternating variation to the pitch of the blades in the tail rotor of the helicopter, which rotor, for this purpose, needs to be inclined relative to the plane of symmetry of the helicopter containing the longitudinal axis and the vertical axis of the helicopter.

Nevertheless, it has been found that the solution according to those patents FR 2 737 181 and U.S. Pat. No. 5,816,533 presents a first drawback associated with the fact that the aerodynamic excitation leads to excitation of resonant modes of the fuselage structure, and the blades of the tail rotor are controlled in order to reduce the vibration that results therefrom at certain particular points of the helicopter. Unfortunately, that action tends to shift the vibration nodes and antinodes along the structure, but without thereby eliminating excitation of the resonant modes of said structure.

As a result, the tail fin and the horizontal stabilizer, in particular, are subjected to the bending of the structure where they are attached thereto, depending on the way the structure responds to the excitation.

A second drawback of the system described in those patents lies in an increase in the level of noise that is generated because of the variations in the characteristic parameters (speed, pressure, . . . ) of the air flow through the tail rotor as generated by varying the angle of incidence of its blades.

These effects are harmful for the environment and raise severe problems in terms of regulations.

It should also be observed, by way of example, that another drawback due to changing the angle of incidence of the blades of the tail rotor for opposing the above-mentioned vibration lies in said variations in the angle of incidence of the blades of said rotor generally generating alternating forces and moments which reduce the lifetime of the assembly of parts constituting the rotor and the means for driving it in rotation.

OBJECTS AND SUMMARY OF THE INVENTION

An object of the present invention is to remedy these drawbacks. The invention provides a method making it possible to reduce or even eliminate, in simple and effective manner, the vertical vibration generated on the structure of a helicopter by the air flow or slipstream passing through the main rotor for providing lift and propulsion to said helicopter, and/or by the air flow along the fuselage, said helicopter having a substantially horizontal stabilizer that is tiltable at least in part, a fuselage, a main rotor for providing lift and propulsion, and where appropriate a tail rotor having blades of variable pitch.

For this purpose, said method of the invention is remarkable in that it comprises:

a) measuring the vibration that has been generated, measurements being performed at at least one location on the structure of the helicopter;

b) determining from said measurements, a variation in the angle of incidence of at least a portion of a substantially horizontal stabilizer, suitable for generating a vertical opposing force for opposing the measured vertical vibration; and c) applying the variation in angle of incidence as determined in this way to a system for controlling the angle of incidence of at least a part of said substantially horizontal stabilizer, without applying alternating variation to the pitch of the blades of the tail rotor.

Thus, by generating said opposing force, it is possible in simple and effective manner to reduce said vertical vibration, the drawbacks of which are mentioned above.

It should also be observed that the method of the invention is that much more effective in that it enables the aerodynamic excitation effect to be cancelled at source, i.e. at the substantially horizontal stabilizer itself, because of the way its angle of incidence is controlled. Consequently, the resonant modes of the fuselage cannot be excited merely by interference from the pulsating and turbulent slipstream coming from the main rotor and from the air stream along the fuselage.

In order to avoid applying control on a continuous basis and in order to take account only of the vibration that is the most important and the most damaging, it is advantageous to apply frequency filtering to the measured vibration, and in step b) of the method of the invention to take account of the filtered vibration only.

To this end, it is preferable to use a lowpass filter whose cutoff frequency lies in the range 20 hertz (Hz) to 30 Hz approximately.

Furthermore, for reasons of stability and safety, the amplitude of the opposing force is advantageously limited to a predefined value.

In addition, for reasons of maneuverability, and in order to detect any degradation in the unbalance of the main rotor of the helicopter, application of the method of the invention to reducing vibration can be omitted when said helicopter is on the ground.

Similarly, application of the method may be omitted while the helicopter is subject to particular flight conditions.

Furthermore, the substantially horizontal stabilizer is remarkable in that it comprises at least one of the following characteristics:
  it is a single stabilizer, on one side of the tail boom or on one side of a tail fin, or
  it comprises two stabilizer portions, each portion being situated on a respective side either of a tail fin, or of the tail boom.

In addition, in order to minimize any additional vibration, it is possible to generate variation in the angle of incidence of at least a portion of a tail fin.

The tail fin is remarkable in that it includes at least one of the following characteristics:
  it may be a single tail fin situated either substantially in the plane of symmetry of the helicopter or inclined relative to said plane, or else it may be substantially vertically at the outer end of the substantially horizontal stabilizer; or
  it may comprise two fins, in particular in one of the following configurations:
    it may be V-shaped at the rear end of the tail boom; or
    the substantially horizontal stabilizer may comprise two aerodynamic surfaces disposed on either side of the tail boom, with each of the two outer ends of these two aerodynamic surfaces carrying a substantially vertical fin.

In addition, and advantageously, the method may be implemented to vary the angle of incidence of a portion only of a stabilizer or a tail fin, i.e. a flap disposed at the trailing edge of said stabilizer or of said tail fin, with the span of said flap possibly being less than the span of said stabilizer or of said tail fin. Under such circumstances, the upstream portion of said stabilizer or of said tail fin is stationary.

It should also be observed that the lateral and/or horizontal vibration can be measured specifically on each substantially horizontal stabilizer and/or each tail fin so as to move each of said aerodynamic surfaces in such a manner as to avoid any excitation of the resonant modes of the fuselage and of the tail boom under the effect of excitation by the slipstream.

The present invention also provides a device for reducing or even eliminating the vibration generated on the structure of a helicopter by the air flow or slip-stream passing through the main rotor for providing said helicopter with propulsion and lift, and/or by the air stream over the fuselage, said helicopter including at least a substantially horizontal stabilizer that is tiltable at the rear of the fuselage, having an angle of incidence that is controlled by a control system.

According to the invention, said device is remarkable in that it comprises:
  at least one sensor suitable for measuring the vibration generated on the structure of said helicopter; and
  computer means arranged (programmed):
    to respond to said measurements to determine a variation in the angle of incidence of at least a portion of a substantially horizontal stabilizer suitable for generating a vertical opposing force for opposing the vertical vibration; and
    to transmit the variation in angle of incidence as determined in this way to said system for controlling the angle of incidence of at least a part of said substantially horizontal stabilizer, without applying any alternating variation to the pitch of the blades of the tail rotor.

In a particular embodiment, said device advantageously additionally includes at least one steerable tail fin with variation in the angle of incidence thereof being controlled by said computer means to generate an opposing force for opposing said additional vibration.

The sensor may be constituted by one of the following in particular:
- an accelerometer;
- a gyroscope;
- a strain gauge;
- an angle of attack probe;
- a sideslip indicator; and
- a microphone for evaluating the aerodynamic environment of the substantially horizontal stabilizer and/or of the tail fin.

Advantageously, the vibration measuring sensor(s) is/are disposed on a stationary portion of the tiltable stabilizer and optionally on a stationary portion of the steerable tail fin.

The invention may be applied to a helicopter that does not have an (anti-torque) tail rotor.

BRIEF DESCRIPTION OF THE DRAWINGS

The accompanying figures show clearly how the invention can be implemented. In the figures, identical references are used to designate elements that are similar.

MORE DETAILED DESCRIPTION

Figure 1:
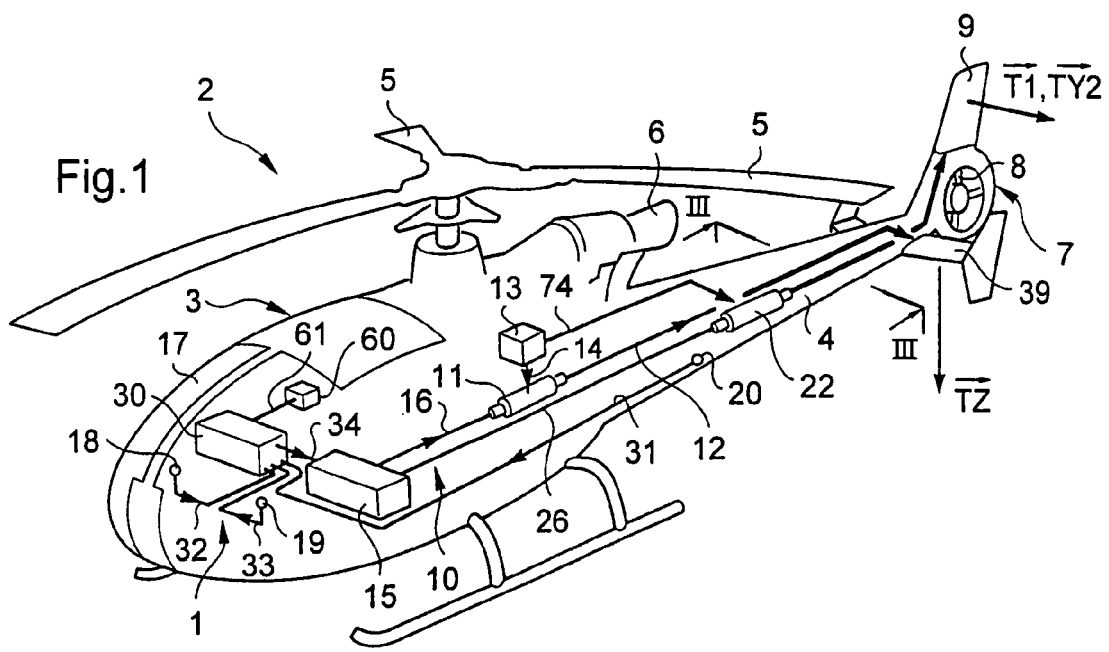
FIG. 1 is a diagram of a device in accordance with the invention mounted on a helicopter.

The device 1 of the invention and shown diagrammatically in FIG. 1 is intended to reduce vibration of the kind known as "tail shake", which vibration occurs in the structure of a helicopter 2, as described below.

As can be seen in FIG. 1, said helicopter 2 comprises:
- a fuselage 3 extended rearwards by a tail boom 4;
- a main rotor 5 for providing lift and propulsion that is driven by means of drive delivered by an engine 6;
- a tail rotor 7 provided in known manner with blades 8 serving to compensate the yaw torque of said main rotor 5; and
- a substantially horizontal stabilizer 39.

Said substantially horizontal stabilizer 39 used for providing said helicopter 2 with stability in pitch can be tilted to vary its angle of incidence by means of a control system 10 which comprises:
- an actuator 11 or the like (connected to a connection 12 represented diagrammatically to said substantially horizontal stabilizer 39) and powered from a power source 13 via a connection 14; and
- a control device 15 which provides control orders to said actuator 11 via a connection 16.

Figure 2:
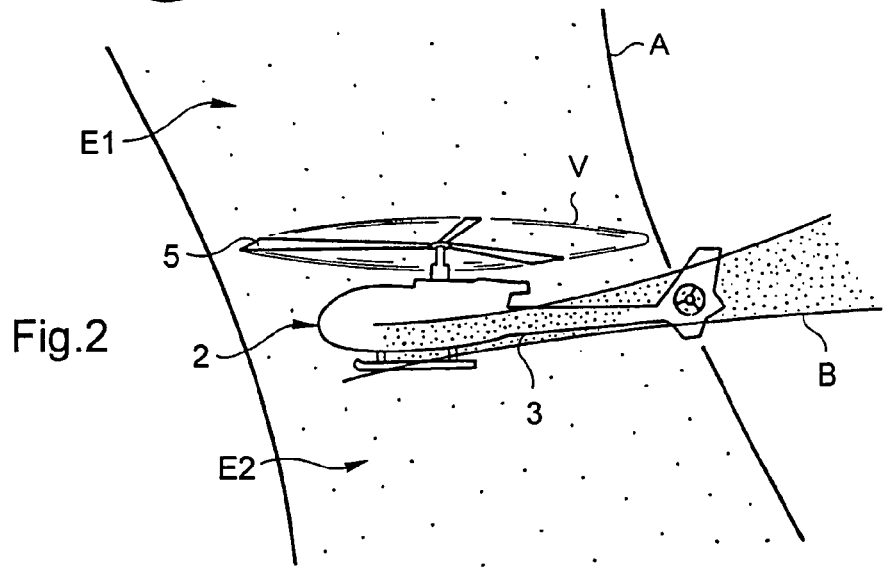
FIG. 2 is a diagram showing the slipstream formed by rotation of the main rotor and by the fuselage of a helicopter, thereby generating vibration.

In order to provide lift and forward drive for the helicopter 2, it is known that the main rotor 5 sucks in air from a space E1 situated above the helicopter and discharges it into a space E2 situated beneath it, with the air being accelerated. This establishes a slipstream A of moving air with varying pressure and speed, of a diameter at the helicopter 2 that is substantially equal to the diameter of the rotary wing V, as shown in FIG. 2. On coming into contact with the helicopter 2, this air flow or slipstream (A) and the air flow (B) along the fuselage 3 generate vibration in the structure 17 of said helicopter 2.

The vertical vibrations due mainly to the excitation of the resonant modes of the structure 17 of the helicopter 2 by the air flow and in particular the first mode in vertical bending of the tail boom 4 of the helicopter 2 generally presents a frequency of a few hertz, and is particularly harmful.

The vertical vibration as generated in this way presents the following drawbacks in particular concerning:
- crew and passenger comfort;
- fatigue of parts and equipment; and
- the operation of weapons systems (not shown) if the helicopter 2 is fitted therewith.

The device 1 of the invention is intended to reduce said vertical vibration in order to remedy those drawbacks.

To this end, the device 1 comprises:
- sensors 18, 19, and 20 of known type, e.g. accelerometers, gyroscopes, strain gauges, angle of attack (AOA) probes, yaw probes, microphones, all mounted at various locations on the structure 17 of the helicopter 2 and suitable for measuring vibration generated at said locations of said structure 17; and
- computer means 30 connected via respective connections 31, 32, and 33 to said sensors 18, 19, and 20, and capable:
  - to respond to said vibration measurements to determine a variation in angle of incidence for said substantially horizontal stabilizer 39 suitable for generating a vertical opposing force $\vec{TZ}$ for opposing said vertical vibration; and
  - to apply the variation in angle of incidence as determined in this way to the control device 15 of said control system 10 for controlling the angle of incidence of said substantially horizontal stabilizer 39 via a connection 34.

Thus, existing vibration is reduced by the action of the opposing force $\vec{TZ}$ generated by controlling the angle of incidence of the substantially horizontal stabilizer 39.

In addition, the device 1 of the invention serves to limit resonance of one or more resonant modes of the structure situated close to a harmonic of the frequency of rotation of the main rotor, where deformation of the tail boom of the helicopter 2 is large for said modes.

Furthermore, it should be observed that by placing at least one of the sensors 18, 19, 20 on the substantially horizontal stabilizer 39 itself, the excitation of the tail boom 4 can be cancelled since the correcting effect is applied specifically at the substantially horizontal stabilizer 39, which is where the excitation produced by the slipstream is applied. As a result, the structure of the helicopter as a whole is not subjected to disturbances of an aerodynamic kind exerted on said substantially horizontal stabilizer 39.

Figure 3:
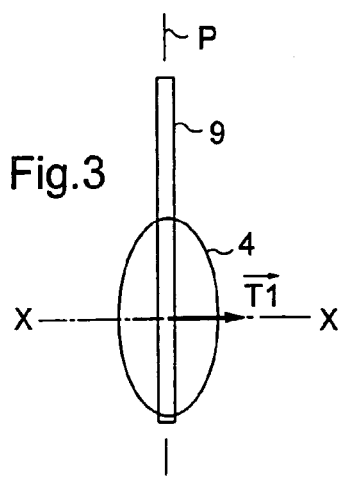
FIG. 3 shows a force opposing vibration generated on a helicopter whose tail fin is parallel to the plane of symmetry of said helicopter, using a diagrammatic cross-section on line III-III of FIG. 1.

When the helicopter 1 is subjected not only to said vertical vibration, but also to lateral vibration, it is possible to use a tail fin 9 of controllable angle of incidence (shown in FIG. 1 and FIG. 3) to generate a horizontal opposing force $\vec{T1}$ opposing said lateral vibration in application of the invention. Under such conditions, a variation to the angle of incidence of the tail fin 9 is applied to the control device 15 which acts via a connection 26 to apply control orders to an actuator 22 powered by a power supply 13 via a connection 74.

Figure 4:
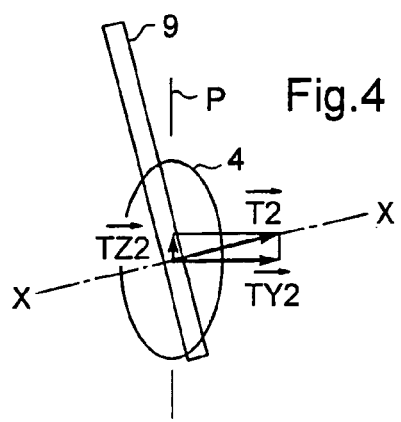
FIG. 4 shows a force opposing vibration, generated on a helicopter whose tail fin is inclined relative to the plane of symmetry of said helicopter.

Naturally, the present invention also applies to a helicopter 2 in which at least one of the tail fins slopes relative to the plane of symmetry P of the helicopter, as shown in FIG. 4.

To this end, variation in the angle of incidence of the tail fin 9 is determined suitable for generating an opposing force $\vec{T2}$ that presents a lateral component $\vec{TY2}$ and a component $\vec{TZ2}$ such that:

said lateral component $\vec{TY2}$ of the force $\vec{T2}$ effectively opposes said lateral vibration; and said vertical component $\vec{TZ2}$ of the force $\vec{T2}$ is added to said force $\vec{TZ}$ and effectively opposes said vertical vibration.

Furthermore, said computer means 30 may incorporate filter means for frequency filtering the measured vibration so as to retain only vibration at a frequency that is below a determined frequency of the order of 20 Hz to 30 Hz. This serves in particular to avoid controlling said tail fin and/or said stabilizer on a quasi-continuous basis, by ignoring certain kinds of vibration that are negligible.

Alternatively, a bandpass filter could be used.

In a particularly advantageous embodiment, said computer means 30 may also be connected to means (not shown) serving to indicate when the helicopter 2 is on the ground so that said computer means 30 then transmits no control orders to the control device 15, for as long as said helicopter 2 remains on the ground. The device 1 of the invention is thus made inactive while on the ground, thus making it possible in particular to detect any possible degradation in the unbalance of the helicopter, where such detection would be impossible were the device 1 to be in operation.

Furthermore, in another particular embodiment that is not shown, it is also possible to provide for the device 1 of the invention to be made inactive while in flight, on the appearance of particular flight conditions.

Figure 5:
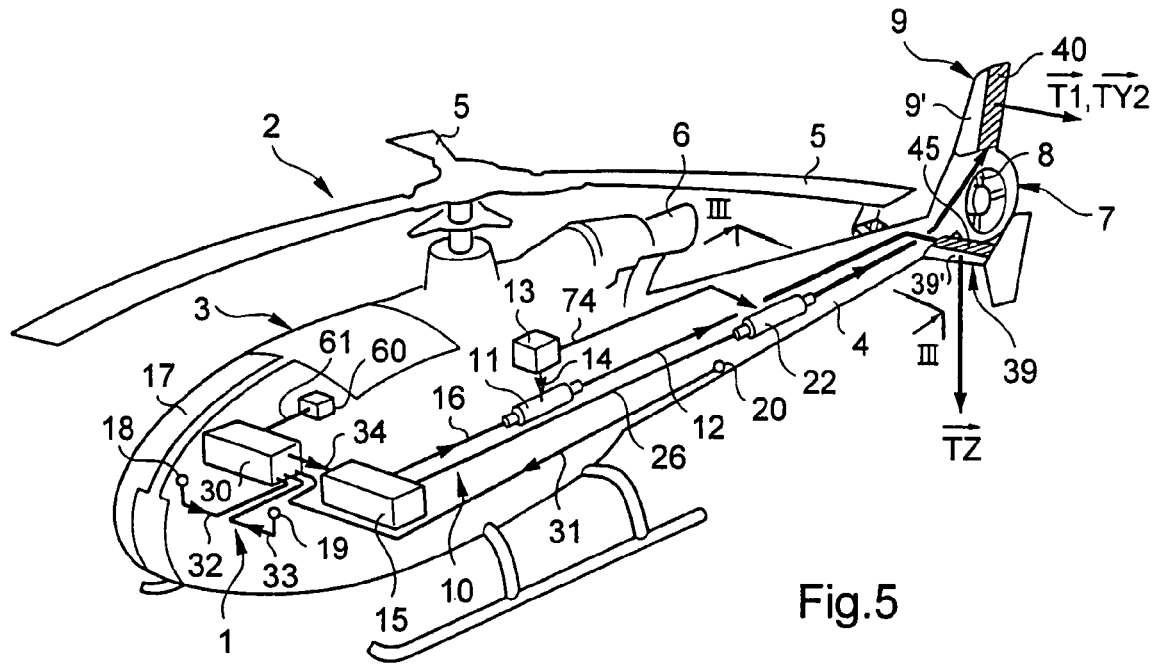
FIG. 5 is a diagram of a device of the invention implementing flaps on a tail fin and on a substantially horizontal stabilizer.

Naturally, and as shown diagrammatically in FIG. 5, a variation in angle of incidence can be applied to a tiltable stabilizer constituted by a trailing edge flap 45 fitted to at least one of the substantially horizontal stabilizer 39, and possibly to a steerable tail fin implemented by a flap 40, 51 respectively fitted to at least one tail fin 9, 50, with the upstream portion 39' of the stabilizer and the upstream portion 9' or 50' respectively of the tail fin 9, 50 remaining stationary. These flaps are represented by shading in FIG. 5. Under such circumstances, the span of a flap may be smaller than the span of the corresponding tail fin or stabilizer.

It will also be understood that the invention can be implemented in variants such as the following, for example:

controlling angle of incidence for at least one complete tail fin 9 and for a flap 45 of at least one stabilizer 39;

controlling angle of incidence for at least one complete stabilizer 39 and for a flap 40 of at least one tail fin 9;

controlling angle of incidence for at least one complete tail fin 9 and for at least one complete stabilizer 39; and controlling angle of incidence for a flap 40 of at least one tail fin 9 and a flap 45 of at least one stabilizer 39.

Figure 6:
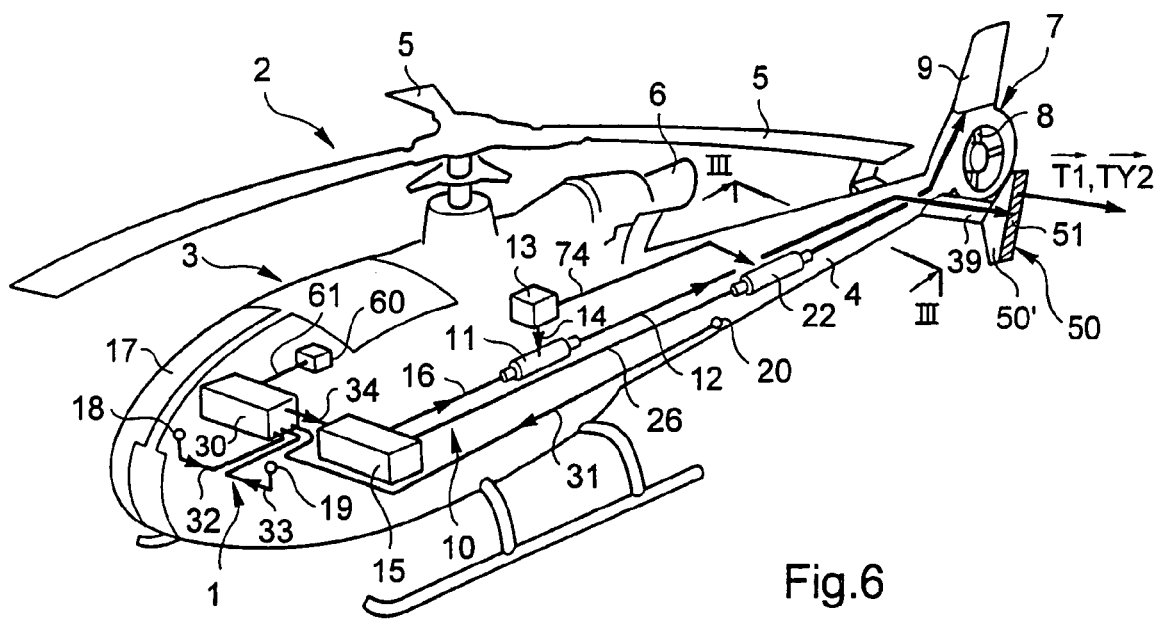
FIG. 6 shows the use of flaps of the invention disposed on two lateral tail fins, each of the tail fins being located at the outer end of a respective one of two substantially horizontal stabilizers disposed symmetrically about the plane of symmetry of the helicopter.

Furthermore, it is also possible to control the angle of incidence of a complete tail fin 50 located at each end of a stabilizer 39, for example, or the angle of incidence of flaps 51 fitted to such tail fins 50, in which case the upstream portions 51' are then stationary, as shown in FIG. 6.

Naturally, these tail fins 50 may also be in a V-shape (not shown) taking the place of the tail fin 9 or in addition to the tail fin 9.

Similarly, it will be understood that varying the angle of incidence of a substantially horizontal stabilizer 39, 45, and possibly also varying the angle of incidence of a tail fin 9, 40, 50, 51 needs to be adapted to each configuration of tail fin and stabilizer and to each flight configuration.

For this purpose, the computer means 30 make use of information relating to each flight configuration, namely, for example: the vertical and horizontal speeds and the attitudes and positions of the helicopter. This information is picked up by sensors 60 for sensing flight configuration (or stage) parameters and delivered to the computer means 30, with the sensors 60 being connected via a connection 61 to said computer means 30.

Under such conditions, said sensors 18, 19, 20 may advantageously be secured to said tiltable stabilizer 39, 45 and optionally to said steerable tail fin 9, 40, 50, 51, and preferably on said stationary portions of said stabilizer and tail fin.

In a preferred embodiment, the speed of travel of the helicopter relative to the air is measured by an indicated air speed (IAS) sensor, and the control gain applied to varying the angle of incidence of the horizontal stabilizer—and where appropriate the tail fin—is varied as a function of the measured speed.

In a particular embodiment, when the air speed exceeds a predetermined threshold value, said gain G is inversely proportional to the square of the air speed, in particular in application of the following equation:

$$G = \frac{k}{IAS^2} \times (M + \varphi)$$

where k is a constant, M is the (filtered) measured vibration, and φ is a phase offset that is selected or continuously modified in order to minimize the amplitude of the measured vibration.

Naturally, the present invention is capable of numerous variations as to its implementation. Although several embodiments are described above, it will readily be understood that it is not conceivable to identify all possible embodiments in exhaustive manner. Naturally, it is possible to envisage replacing any of the means described by equivalent means without thereby going beyond the ambit of the present invention.

What is claimed is:

1. A method of reducing vibration in a structure of a helicopter having a main rotor and a tail boom with a substantially horizontal stabilizer and a tail rotor, comprising the steps of:

exciting a vertical vibration in the tail boom of the helicopter with a downward flow of air from the main rotor onto the structure of the helicopter, the downward flow of air having a diameter substantially equal to a diameter of the main rotor and having varying pressure and speed;

measuring the vertical vibration on at least one location of the helicopter;

determining a variation of an angle of incidence of a movable control surface of the substantially horizontal stabilizer that generates a force opposing the measured vertical vibration; and varying the angle of incidence of the movable control surface of the substantially horizontal stabilizer the determined variation to generate the force opposing the measured vertical vibration without applying alternating variation to a pitch of blades of the tail rotor.

2. The method of claim 1, wherein the generated vertical vibration is a first vertical bending mode of the tail boom.

3. The method of claim 1, wherein the method is inoperable when the helicopter is on the ground and in particular flight conditions.

4. The method of claim 1, wherein the at least one location where the vertical vibration is measured is on the substantially horizontal stabilizer.

5. The method of claim 1, further comprising the step of filtering the measured vertical vibration.

6. The method of claim 1, further comprising the step of limiting an amplitude of the force opposing the measured vertical vibration.

7. The method of claim 1, wherein the movable control surface of the horizontal stabilizer is a trailing edge flap that is hinged to a stationary upstream part of the horizontal stabilizer.

* * * * *